United States Patent [19]

Marks

[11] Patent Number: 5,109,104

[45] Date of Patent: Apr. 28, 1992

[54] PREPARATION OF POLYAMIDES FROM OMEGA-AMINONITRILES

[75] Inventor: David N. Marks, Wilmington, Del.

[73] Assignee: E. I. Du Pont de Nemours and Company, Wilmington, Del.

[21] Appl. No.: 591,191

[22] Filed: Oct. 4, 1990

[51] Int. Cl.$^5$ .............................................. C08G 69/00
[52] U.S. Cl. ...................................... 528/313; 528/310
[58] Field of Search ................................ 528/313, 310

[56] References Cited

U.S. PATENT DOCUMENTS 4,568,736  2/1986  Curatolo et al. ...................... 528/313

Primary Examiner—Harold D. Anderson

[57] ABSTRACT

High quality polyamides are prepared from a mixture of an omega-aminonitrile, an oxygenated phosphorous catalyst, and water. When the reactor temperature reaches about 200 degrees to about 260 degrees C. continuously adding water, and continuously removing water vapor and ammonia until 15 to 75 grams of water have been added per 100 grams of omega-aminonitile, and then stopping the water addition and continuing the reaction until a high molecular weight polyamide is obtained.

6 Claims, No Drawings

PREPARATION OF POLYAMIDES FROM OMEGA-AMINONITRILES

FIELD OF THE INVENTION

This invention relates to the preparation of high quality polyamides from omega-aminonitriles.

BACKGROUND OF THE INVENTION

Polyamides are conventionally prepared by the condensation polymerization of a diacid, such as adipic acid, and a diamine such as hexamethylene diamine, or by the polymerization of a lactam such as epsilon-caprolactam. However, other process are known, for example in Greenewalt U.S. Pat. No. 2,245,129 polyamides are prepared by the polymerization of omega-aminonitriles, and Curatolo et al U.S. Pat. No. 4,568,736 discloses using such monomers along with a catalytic amount of an oxygen containing phosphorus compound. German published patent application of Hofmann et al DE 3,534,817 A discloses polymerization of such monomers using catalysts, and injecting water into the reactor during the polymerization.

SUMMARY OF THE INVENTION

The present invention is a process for the preparation of polyamide which comprises heating a mixture comprising an omega-aminonitrile, water, and an oxygenated phosphorus catalyst at a pressure in the range of about 200 to 350 psig, and when the temperature reaches about 200 degrees C to 260 degrees C, adding water continuously at a rate of from 10 to 50 grams per hour per 100 grams of omega-aminonitrile initially present in the mixture and after the temperature is above 240 degrees C continuously removing water vapor and ammonia from the reactor, and maintaining the temperature in the range of 240 degrees C to 310 degrees C until 15 to 75 grams of water has been added per 100 grams of omega-aminonitrile initially present in the mixture, then stopping the water addition, and polymerizing the resulting mixture at a temperature in the range of about 240 degrees C to about 330 degrees C until polyamide having a number average molecular weight of at least about 10,000 is formed.

DETAILED DESCRIPTION OF THE INVENTION

The process of the invention produces a high quality polymer in a relatively short reaction time. The product is high quality in that it is of good color, and of high molecular weight. The continuous feed of water and the continuous removal of water vapor and ammonia from the mixture while in the temperature range of above 240 degrees C also removes color forming by-products.

The polymerization is controlled at a low pressure (200 to 350 psig) in order to purge ammonia and organic by-products from the reaction mixture. The purging of ammonia speeds the rate of hydrolysis of the nitrile groups. The organic by-products are deleterious to the color and the molecular weight of the product.

Any omega-aminonitrile may be used as a monomer for this invention. Preferred are the omega-aminonitriles shown in U.S. Pat. No. 4,568,736 i.e. those having the formula:

where R is a divalent organic racial and R' is hydrogen or a univalent organic radical. Preferred compounds are those where both R and R' are linear aliphatic radicals, and the compound has 6 to 12 carbon atoms. Representative examples include, 6-aminocapronitrile, 3-aminopropionitrile 4-cyanoaniline etc.

Water is added during the initial stages of the polymerization (usually during the first 0.5 to 1.5 hours) to replenish the water needed to hydrolyze the nitrile groups. Since the polymerization is run at low pressure the water concentration during the high temperature stage (above about 250 degrees C) of the reaction is low. The low concentration of water favors the polyamidation reaction and shortens the reaction time needed to make high molecular weight polymer. The addition of water also aids the purging of ammonia and organic by-products from the reaction.

Initial heating is preferably as fast as possible to keep to a minimum formation of organic by-products. Rapid heating leads to an exotherm attributed to nitrile hydrolysis of the aminonitrile. The addition of water moderates the exotherm and controls the polymerization temperature to less than about 290 degrees C.

The amount of water present in the reaction mixture at the beginning of the process is usually less than 50% by weight of the mixture, and best results are obtained when the amount of water is less than about 30% by weight. About 10% to about 25% by weight water is preferred, however, it is possible to begin the process with a mixture containing as little as about 1% by weight water.

The oxygenated phosphorus catalysts can be added in the acid form, e.g. phosphoric, phosphorous, hypophosphorous, phenylphosphinic, etc. or as salts of the acids. Oxygenated phosphorus acids are preferred. Any phosphorus compound that hydrolyzes to an oxygenated phosphorus acid or a salt during the reaction is also useful. The catalyst is typically added to the starting mixture at a wt. % (relative to the aminonitrile) of 0.05 to 0.3 preferably 0.1 to 0.2. Lower ratios can be used but the resulting polymer tends to be of lower molecular weight. U.S. Pat. No. 4,568,736 lists many specific phosphorus catalysts that are known to be useful in this type of reaction. See also Stamatoff U.S. Pat. No. 2,705,227.

The final polymerization temperature is between 240-330 degrees C, and preferably within the range 260-290 degrees C. At higher temperatures polymer degradation occurs. At lower temperatures the rate of reaction is reduced so longer reaction times are required to make high molecular weight polymer.

The polymerization pressure is controlled between 13 and 25 atmospheres (175 and 350 psig) preferably in the range of 15 to 21 atmospheres. At higher pressure poorer polymer color and molecular weight are obtained. At lower pressures more unreacted aminonitrile is lost by vaporization from the reaction.

For an initial 100 gram charge of the aminonitrile, water is added at a rate of from 10 to 50 grams per hour, preferably 15 to 30 grams per hour. At lower addition rates the molecular weight of the product is reduced. Higher addition ranges may be used for short periods during the polymerization as a means of controlling the reaction exotherm.

EXAMPLE 1

A 300 cc stainless steel autoclave was charged with 100 grams of 6-aminocapronitrile, 40 grams of deionized water, and 0.2 grams of 85% phosphoric acid. A regulator controlling the pressure in the system was set for 250 psig; i.e. pressure will build-up in the system to 250 psig and then vapor will be released through this regulator to control the pressure at this setting. The autoclave was closed and purged several times with 20 psig of nitrogen to remove air from the system. The contents of the autoclave were agitated and heated in 30 minutes to 240 degrees C. Heat was supplied by an electric band heater surrounding the autoclave. The temperature was measured with a thermocouple inserted through the bottom of the autoclave.

After heating to 240 degrees C, water injection into the autoclave began at 30 cc/hr. Liquid water was added to the autoclave using an Isco piston pump. The contents of the autoclave were heated quickly (5 minutes) to 275 degrees C. Water injection continued at 30 cc/hr. while holding the temperature as closely as possible to 275 degrees C for one hour. Then the water injection pump was turned off.

The pressure in the system was reduced from 250 psig to atmospheric pressure over one hour by adjusting the pressure regulator. During the pressure reduction the temperature was maintained at approximately 275 degrees C. The temperature was maintained at 275 degrees C and the pressure maintained at one atmosphere for 45 minutes, then the agitation was stopped, and the autoclave allowed to cool under a steam atmosphere.

After cooling the polymer was removed in a block from the autoclave and crushed. The polymer color was measured on a Hunter colorimeter It had a yellowness Index of 0.2. The polymer was extracted for 16 hours in boiling water to remove caprolactam and soluble oligomers. The polymer was dried at 90 degrees C under vacuum. The relative viscosity (RV) of 8.4% polymer in 90.0% formic acid was found to be 53, which corresponds to a number average molecular weight of about 18,900.

I claim:

1. A process for the preparation of polyamide which comprises heating a mixture comprising an omega-aminonitrile, water, and an oxygenated phosphorus catalyst at a pressure in the range of about 200 to 350 psig, and when the temperature reaches about 200 degrees C to 260 degrees C, adding water continuously at a rate of from 10 to 50 grams per hour per 100 grams of omega-aminonitrile initially present in the mixture and after the temperature is above 240 degrees C continuously removing water vapor and ammonia from the reactor, and maintaining the temperature in the range of 240 degrees C to 310 degrees C until 15 to 75 grams of water has been added per 100 grams of omega-aminonitrile initially present in the mixture, then stopping the water addition, and polymerizing the resulting mixture at a temperature in the range of about 240 degrees C to about 330 degrees C until polyamide having a number average molecular weight of at least about 10,000 is formed.

2. The process of claim 1 in which the omega-aminonitrile has from 6 to 12 carbon atoms.

3. The process of claim 1 in which the omega-aminonitrile is 6-aminocapronitrile.

4. The process of claim 1 in which the polymerization is carried out with mixing.

5. The process of claim 1 in which the temperature during the period when water is being continuously added is approximately 275 degrees C, and the amount of water added continuously is about 15 to 30 grams of water per hour per 100 grams of omega-aminonitrile initially present in the mixture.

6. The process of claim 1 in which the catalyst is an oxygenated phosphorus acid.

* * * * *